United States Patent [19]

De Groen

[11] Patent Number: 5,515,772

[45] Date of Patent: May 14, 1996

[54] APPARATUS FOR BREWING A DRINK

[75] Inventor: Cornelis De Groen, Hendrik Ido Ambacht, Netherlands

[73] Assignee: J. M. De Jong Duke Automatenfabriek B.V., Sliedrecht, Netherlands

[21] Appl. No.: 345,454

[22] Filed: Nov. 21, 1994

[30] Foreign Application Priority Data

Nov. 19, 1993 [NL] Netherlands ............................ 9302008

[51] Int. Cl.$^6$ ................................................. A47J 31/00
[52] U.S. Cl. ............................................. 99/289; 99/290
[58] Field of Search ............................ 99/289 R, 289 T, 99/289 P, 289 D, 290, 291, 179, 286; 416/433

[56] References Cited

U.S. PATENT DOCUMENTS

| | | | |
|---|---|---|---|
| 1,837,368 | 12/1931 | Medin | 99/289 T |
| 3,095,800 | 7/1963 | Gilbert | 99/289 T |
| 3,213,777 | 10/1965 | Heier | 99/289 T |
| 4,791,859 | 12/1988 | King | 99/289 T |

FOREIGN PATENT DOCUMENTS

| | | |
|---|---|---|
| 0384443 | 8/1990 | European Pat. Off. . |
| 1164760 | 9/1969 | United Kingdom . |
| 1337392 | 11/1973 | United Kingdom . |
| 2250426 | 7/1992 | United Kingdom . |
| 8601387 | 3/1986 | WIPO . |

*Primary Examiner*—Robert W. Jenkins
*Attorney, Agent, or Firm*—Young & Thompson

[57] ABSTRACT

The invention relates to an apparatus for brewing a drink, such as coffee. The apparatus comprises a chamber for accommodating a mixture of water and a ground product to be extracted, the chamber having a perforated base on which a strip of filter material can be laid. There is structure on one side of the base for moving the strip of filter material over the base after a quantity of drink has been brewed and has been removed via the piece of filter material. The structure for moving the strip of filter material comprise a separate transport unit, and fixing structure is provided for fixing the transport unit to one of two opposing sides of the base, as desired. The structure for moving the strip of filter material can also comprise a separate guide unit, which is fixed in each case to that side of the base which is opposite to the side where the transport unit is located. A supply unit for filter material can also be fitted at the side of the base where the guide unit is located. A winding unit for used filter material is optionally fitted at the side of the base where the transport unit is located.

12 Claims, 5 Drawing Sheets

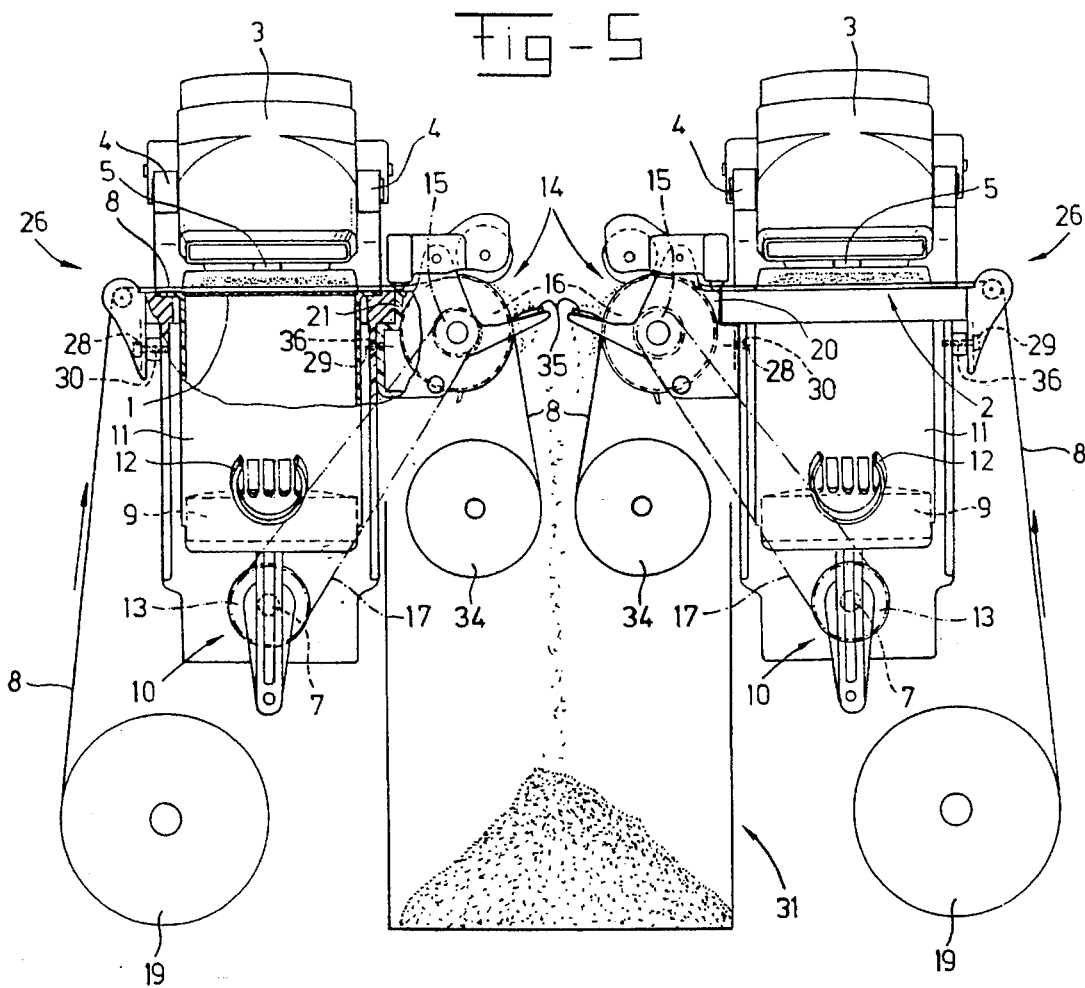

APPARATUS FOR BREWING A DRINK

The invention relates to an apparatus for brewing a drink, such as coffee, comprising a chamber for accommodating a mixture of water and a ground product to be extracted, which chamber has a perforated base on which a strip of filter material can be laid, means being provided on one side of said base for moving the strip of filter material over the base after a quantity of drink has been brewed and removed via the piece of filter material and the base located beneath it.

An apparatus of this type is disclosed in NL-A-6806368. The strip of filter material is moved after a quantity of drink has been brewed, the extracted ground product being carried along with said filter material. The strip and said ground product are then collected in a container, which has to be emptied regularly. In addition, when the strip is moved, a new, clean piece of filter material is brought into position on the perforated base, after which the apparatus is ready to brew a new quantity of coffee.

For some applications of said apparatuses it can be desirable to fit the means for moving the strip in a different position. This is because the position of said transport unit also determines the position where waste is discharged and thus has an influence on the spatial design of the apparatus. This also applies with respect to the position of the guide unit by means of which the strip of filter material is supplied and with respect to the position of the roll of filter material.

The aim of the invention is, therefore, to provide an apparatus of the abovementioned type which in this respect is more flexible than the known apparatuses. This aim is achieved in that the means for moving the strip of filter material comprise a separate transport unit and in that fixing means are provided for fixing the transport unit to one of two opposing sides of the base as desired.

Depending on the desired embodiment of the apparatus, the transport unit can already be fitted in the correct position at the time of manufacture. As said transport unit can be a standard component which is suitable for all embodiments, an adaptation of this type has no associated additional costs.

According to the invention, the means for moving the strip of filter material also comprise a separate guide unit, which guide unit is in each case fitted to that side of the base which is opposite to the side where the transport unit is located. With this arrangement, a supply unit for filter material can also be provided at the side of the base where the guide unit is located. It is also possible for a winding unit for used filter material to be located at the side of the base where the transport unit is located. Said transport unit and winding unit can also be integrated.

A particularly simple and robust embodiment can be obtained if a set of tapped holes is provided on each of two opposing faces of the base and the transport unit and/or guide unit bears an abutment face provided with holes through which bolts are passed which are each screwed into one set of tapped holes, in such a way that the abutment face of the transport unit is clamped against the relevant face. Other fixing techniques are also possible.

In the majority of apparatuses a chain transmission is used to drive the transport unit or winding unit. Said chain transmission is usually located at a side of the base which is perpendicular to the side where said unit is located. With this arrangement as well the desired standardisation can be obtained if the transport unit and/or winding unit comprises a roller which can be provided at both ends with a sprocket in such a way that, depending on the side where the unit is fitted, one or the other sprocket interacts with a drive chain.

If it is undesirable, with this arrangement, to change the direction of rotation of the motor or drive shaft, an additional intermediate wheel can be provided so that the transport unit or winding unit has the correct direction of rotation.

The apparatus according to the invention is particularly suitable for machines which are constructed as twin machines with two of the apparatuses described above. In this case the transport units are in each case fitted on those sides of the respective bases which face one another, in such a way that the transport units are located alongside one another a short distance apart, and a container for receiving the strip with drawn off ground product is located in the area beneath the two transport units.

The removal of the waste can now take place effectively within a limited area in which the two strips, one originating from each of the two apparatuses, come together.

The invention will be explained in more detail below with the aid of an example shown in the figures.

FIGS. 2, 3, 4 and 5 show front views of various machines having two apparatuses according to the invention.

Figure 1:
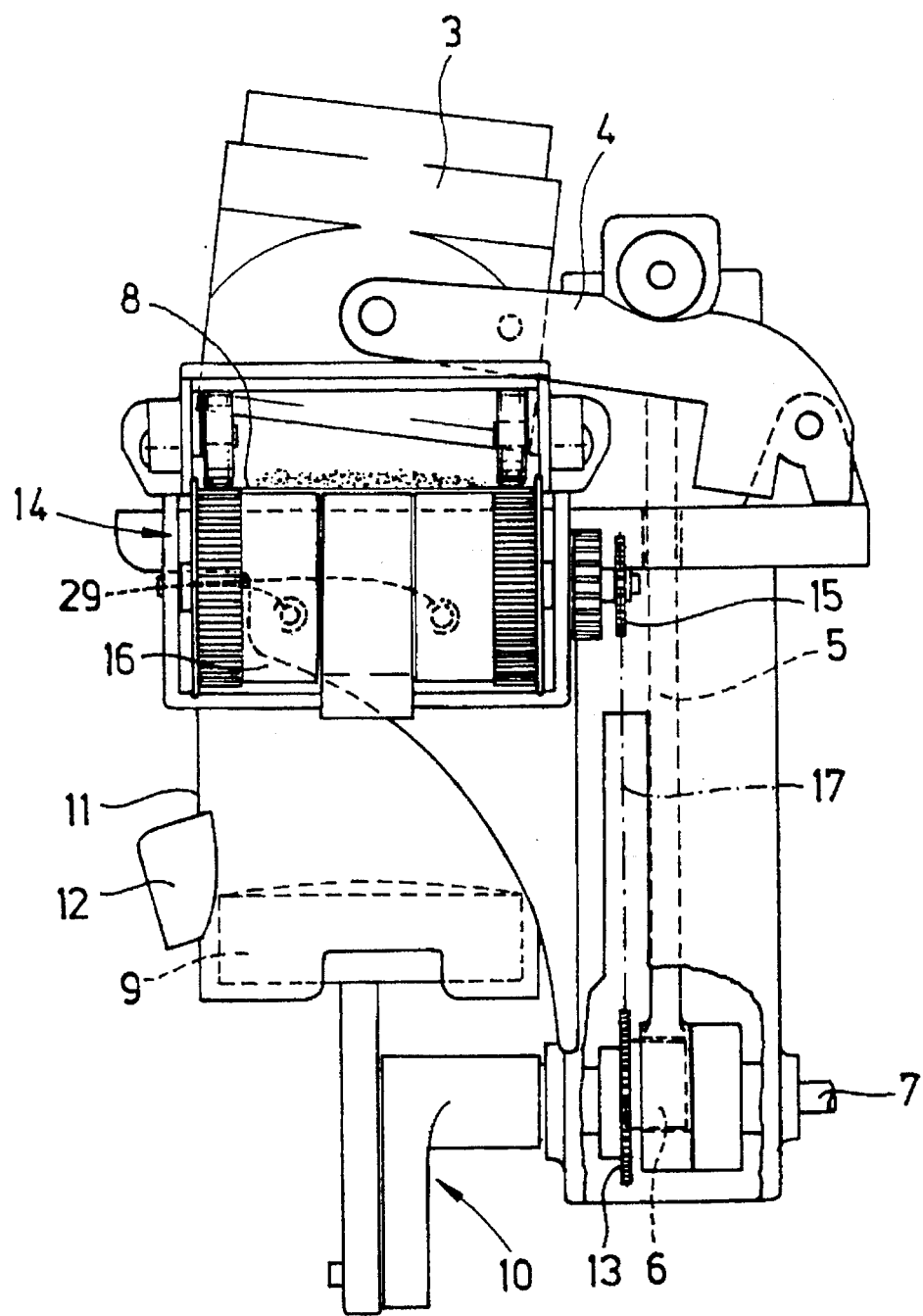
FIG. 1 shows a side view of that side of the apparatus where the transport unit is located.
Figure 2:
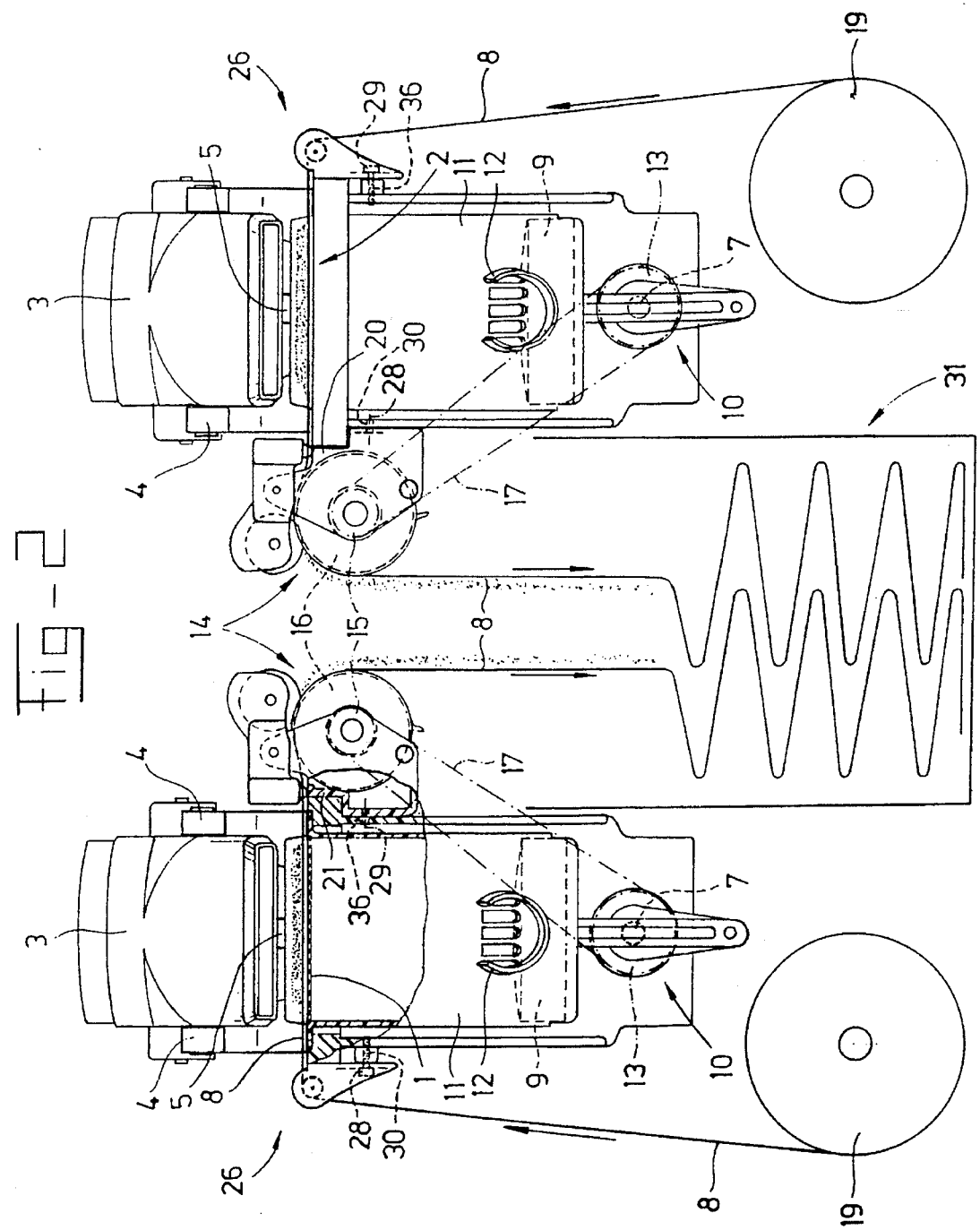

The apparatus shown in FIGS. 1 and 2 is intended for brewing coffee. It comprises a filter plate 1, which forms part of the base which is indicated in its entirety by 2. Above the base there is a chamber 3, which is mounted on arms 4 so that it can be swivelled upwards and downwards. An actuating rod 5 is connected to the arms 4, which actuating rod can be driven by drive shaft 7 via an eccentric. As drive shaft 7 rotates, the chamber 3 is moved, via eccentric 6, actuator rod 5 and arms 4 up and down between the raised position, which is shown, and the lowered position, which is not shown.

In the lowered position, the chamber 3 is held clamped against the base 2. The strip of filter material 8 has been laid over the base 2 beforehand and is held firmly on the base 2 by the pressure exerted by chamber 3. Ground coffee is now introduced in a known manner into the chamber 3 onto the strip of filter material 8. Hot water is also supplied in a known manner.

Subsequently, likewise in a known manner, the piston 9 is moved downwards in the cylinder 11 by means of the crank mechanism 10 on shaft 7, as a result of which the coffee is drawn via the filter material 8 and filter plate 1 into the cylinder 11. As soon as the piston 9 has reached the discharge 12, the coffee is dispensed via said discharge 12.

A sprocket 13 is mounted on the drive shaft 7 in a known manner. A sprocket 15 is likewise mounted on the transport unit, which is indicated in its entirety by 14, and specifically is mounted on the shaft of the transport roller 16. When the drive shaft 7 rotates, the transport roller 16 is brought into rotation via sprocket 13, sprocket 15 and chain 17. As soon as the chamber 3 is moved upwards again after the coffee has been brewed, the strip of filter material 8 is moved on by the driving action of the transport roller 16, as a result of which the extracted ground product is removed and a new piece of filter material 8 is positioned above the filter plate 1.

FIG. 2 shows two apparatuses according to the invention, each of which bears a transport unit 14. According to the invention, the transport unit 14 is a separate unit which can be clamped against one side 20 of the base 2 by means of bolts 28 or clamped at the other side 21 of the base 2 by means of bolts 29. See, respectively, the apparatus on the right and the apparatus on the left in FIG. 2. With this arrangement, in the one case the tapped holes 30 are used for fixing (right-hand section of FIG. 2) and in the other case the tapped holes 36 are used (left-hand section of FIG. 2).

In each case a guide unit 26 and supply roll 19 are fitted on the other side of the base 2. Said guide unit is fixed by means of bolts 29 in tapped holes 36 (embodiment on the right of FIG. 2) or by means of bolts 28 in tapped holes 30 (embodiment on the left of FIG. 2).

The two strips of filter material 8 which issue from the two apparatuses are removed immediately alongside one another, in such a way that they can be collected in a common waste container 31.

Although, in the variant shown in FIG. 2, the invention has been described with reference to a machine in which there are two apparatuses for brewing coffee, it is, of course, also possible to use only one apparatus of this type. In that case as well it is possible to mount the transport unit 14 on one side (for example 20) or the other side (for example 21), depending on the spatial design of the machine.

Figure 3:
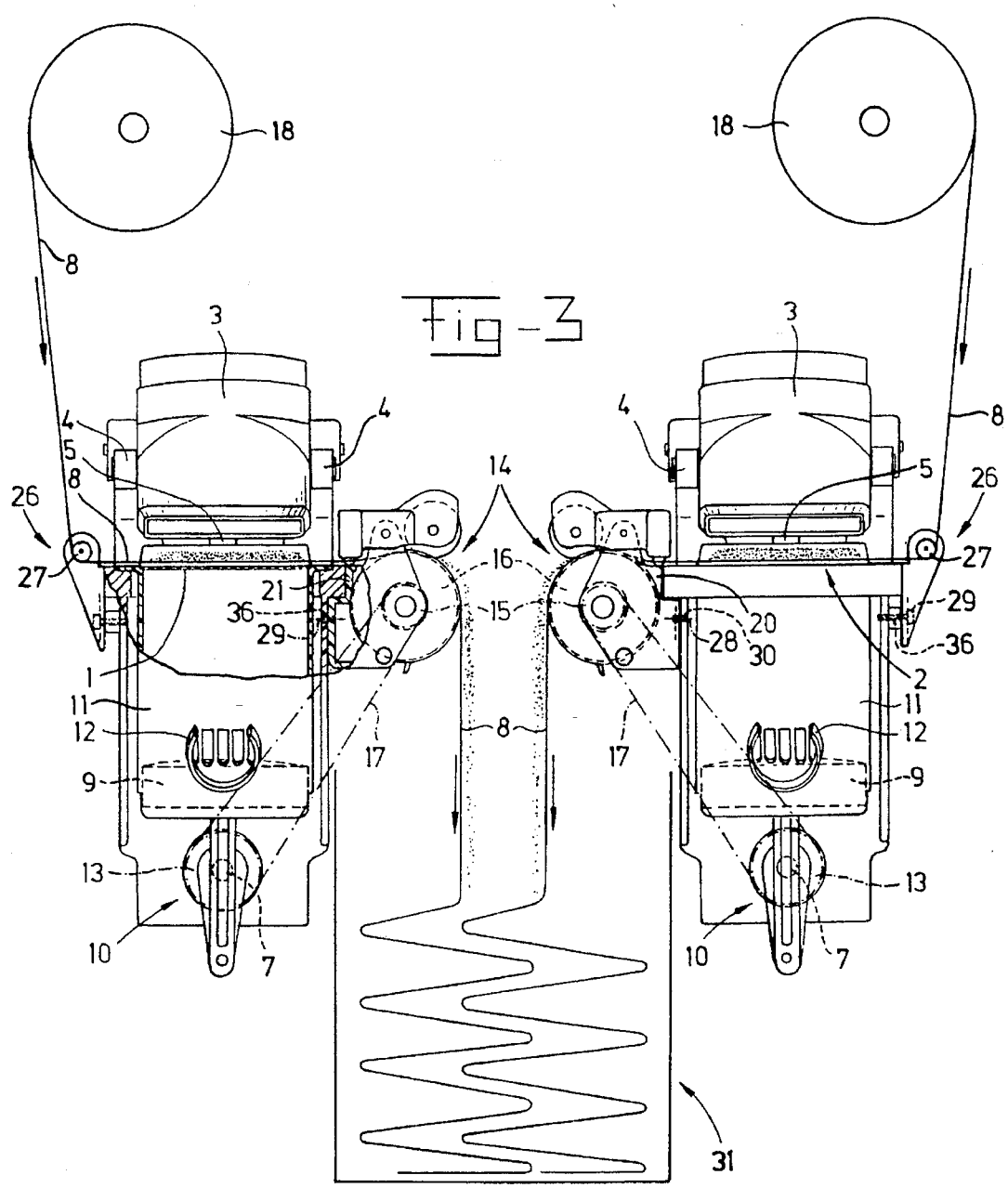

In the variant of the machine shown in FIG. 3, each supply roll 18 is fitted above the associated apparatus in each case. Here the strips of filter material are fed over the filter plate 1 via a guide unit 26. The guide unit 26 can comprise a pin 27 which is affixed at one end only. In this embodiment the strip of filter material can be slid under the pin at the free end. An annular thickening at said free and prevents the strip of filter material from running off the pin.

The spent strips of filter material with the extracted ground product are collected together in the container 31.

Figure 4:
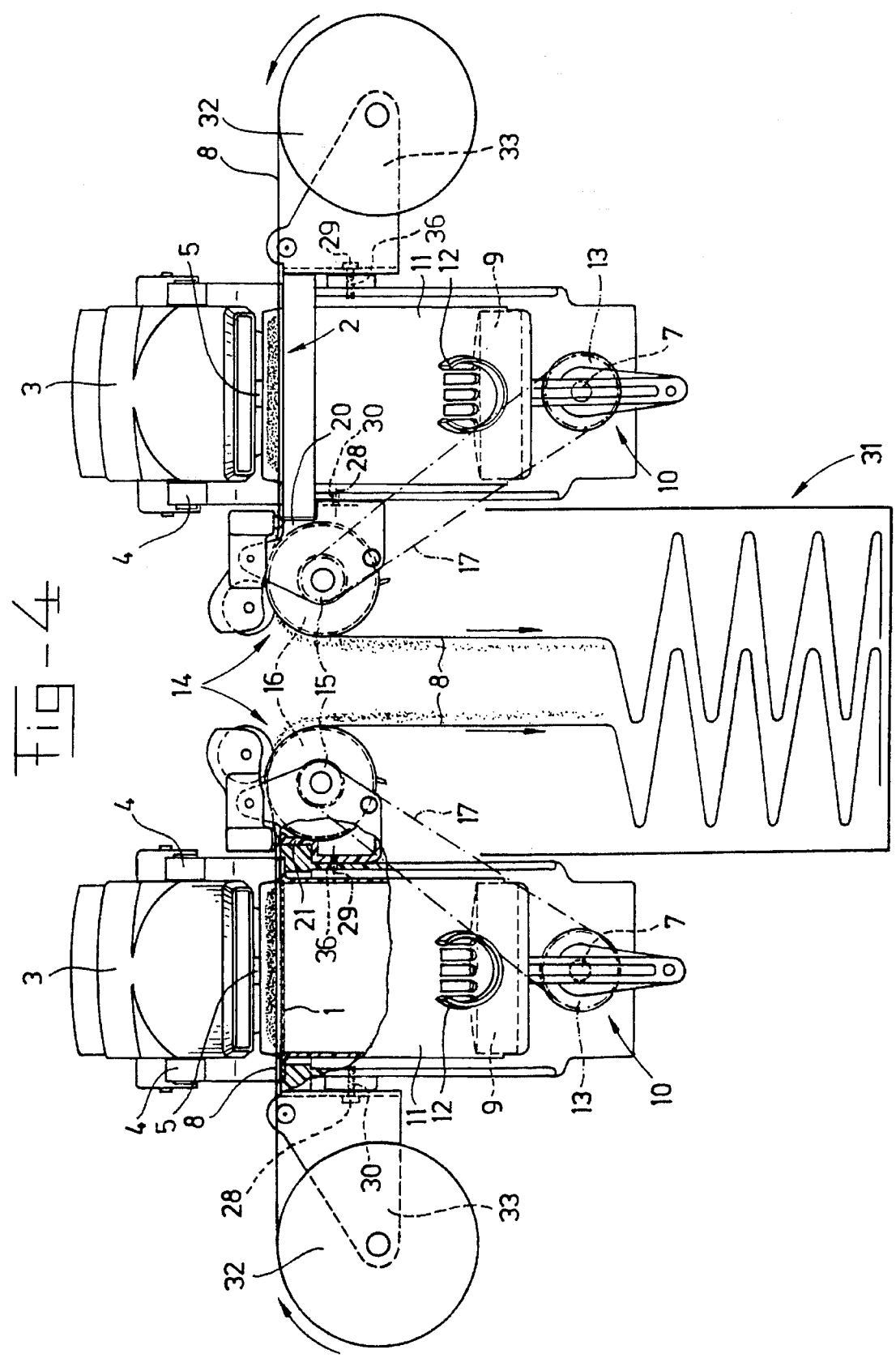

In the variant of the machine according to FIG. 4, each supply roll 32 is mounted by means of spacer 33, in which the guide is integrated. With this variant as well, the spent strips of filter material with extracted ground product are collected in container 31.

In the variant of the machine shown in FIG. 5, two apparatuses are shown, each of which has a transport unit and a winding unit 34. Said units can be integrated. With this arrangement the ground product is scraped off by scrapers 35 and collected in container 31.

I claim:

1. In an apparatus for brewing a drink such as coffee, comprising a chamber for accommodating a mixture of water and a ground product to be extracted, the chamber having a perforated base on which a strip of filter material can be laid, means on one side of said base for moving the strip of filter material over the base after a quantity of drink has been brewed and removed via the piece of filter material and the base located beneath the piece of filter material; the improvement wherein the means for moving the strip of filter material comprise a separate transport unit, supporting means on two opposite sides of the base, the supporting means on each side being adapted to support said transport unit on the corresponding side, and fixing means for selectively fixing a transport unit to a selected one of said two opposite sides of the base as desired.

2. Apparatus according to claim 1, wherein the means for moving the strip of filter material also comprise a separate guide unit, which guide unit is in each case fitted to that side of the base which is opposite to the side where the transport unit is located.

3. Apparatus according to claim 1, wherein a supply unit for filter material is additionally provided at the side of the base where the guide unit is located.

4. Apparatus according to claim 1, wherein a winding unit for used filter material is also located at the side of the base where the transport unit is located.

5. Apparatus according to claim 1, wherein a set of tapped holes is provided on each of two opposing faces of the base and at least one unit bears an abutment face provided with holes or grooves through which bolts are passed which are each screwed into one set of tapped holes, in such a way that the abutment face of said unit is clamped against the relevant face.

6. Apparatus according to claim 1, wherein the transport unit and/or winding unit comprises a roller which can be provided at both ends with a sprocket in such a way that, depending on the side where the unit is fitted, the one or the other sprocket interacts with a drive chain.

7. Machine according to claim 6, wherein an apparatus is provided with a roll of filter material which is fitted above the apparatus in question.

8. Machine according to claim 6, wherein an apparatus is provided with a roll of filter material which is fitted below the apparatus in question.

9. Machine according to claim 6, wherein an apparatus is provided with a roll of filter material which is fitted alongside the apparatus in question.

10. Machine for brewing a drink, provided with two apparatuses according to claim 1, wherein the transport units are in each case fitted on those sides of the bases which are facing one another, in such a way that the transport units are located alongside one another a short distance apart, and a container for collecting the extracted ground product is located in the area beneath the two transport units.

11. Machine according to claim 10, wherein the winding units are in each case fitted on those sides of the bases which face one another.

12. Machine according to claim 10, wherein guide means are fitted on those sides of the bases which face away from one another.

\* \* \* \* \*